(12) United States Patent
Kuwano et al.

(10) Patent No.: US 8,797,661 B2
(45) Date of Patent: Aug. 5, 2014

(54) DRIVING MECHANISM, LENS BARREL AND CAMERA

(75) Inventors: Kunihiro Kuwano, Kawasaki (JP); Hitoshi Nishimoto, Yokohama (JP)

(73) Assignee: Nikon Corporation, Tokyo (JP)

( * ) Notice: Subject to any disclaimer, the term of this patent is extended or adjusted under 35 U.S.C. 154(b) by 23 days.

(21) Appl. No.: 13/248,694

(22) Filed: Sep. 29, 2011

(65) Prior Publication Data

US 2012/0081805 A1  Apr. 5, 2012

(30) Foreign Application Priority Data

Sep. 30, 2010 (JP) ................ 2010-220713

(51) Int. Cl.
*G02B 7/02* (2006.01)

(52) U.S. Cl.
USPC .......................................... 359/824

(58) Field of Classification Search
USPC .............. 359/824–830; 396/72; 310/328, 310/323.01–323.19
See application file for complete search history.

(56) References Cited

U.S. PATENT DOCUMENTS

| 4,965,482 A | 10/1990 | Ohnishi et al. | |
| 2007/0217775 A1* | 9/2007 | Shirono et al. | 396/72 |
| 2009/0058227 A1* | 3/2009 | Takahashi et al. | 310/323.16 |

FOREIGN PATENT DOCUMENTS

| JP | A-59-230473 | 12/1984 |
| JP | A-2-228275 | 9/1990 |
| JP | A-5-122949 | 5/1993 |
| JP | A-6-105571 | 4/1994 |
| JP | A-8-275558 | 10/1996 |
| JP | A-2007-221988 | 8/2007 |
| JP | A-2007-236138 | 9/2007 |

OTHER PUBLICATIONS

Sep. 18, 2012 Japanese Office Acton issued in Japanese Patent Application No. 2010-220713 (with Translation).

* cited by examiner

*Primary Examiner* — Ricky Mack
*Assistant Examiner* — Mustak Choudhury
(74) *Attorney, Agent, or Firm* — Oliff PLC

(57) ABSTRACT

A driving mechanism includes a first piezoelectric element and a first driving member that is driven by the first piezoelectric element and that vibrates in a first direction. The first driving member includes a second piezoelectric element and a second driving member that is driven by the second piezoelectric element and that vibrates in a second direction different from the first direction. A difference between the vibration resonance frequency of the first driving member and the vibration resonance frequency of the second driving member is equal to or less than the half-width at a half maximum of a function representing an amplitude frequency characteristic in the vibration of the first driving member.

8 Claims, 4 Drawing Sheets

DRIVING MECHANISM, LENS BARREL AND CAMERA

CROSS-REFERENCE TO RELATED APPLICATION

Priority is claimed on Japanese Patent Application No. 2010-220713, filed on Sep. 30, 2010, the contents of which are incorporated herein by reference.

BACKGROUND

1. Field of the Invention

The present invention relates to a driving mechanism, a lens barrel, and a camera.

2. Description of Related Art

A driving mechanism using a piezoelectric element was known in the past. As such a driving mechanism, a driving mechanism was known in which a driving target member is driven by driving a plurality of piezoelectric elements and causing tip members coming in contact with the driving target member, and then move the tip members elliptically (for example, see Japanese Patent Application No. 2007-236138). When an XYZ orthogonal coordinate system is defined in the Japanese Patent Application No. 2007-236138, the driving target member is driven in the X axis direction by the elliptical movement of the tip members parallel to the XZ plane.

SUMMARY

However, the conventional driving mechanism mentioned above has a problem in that the vibration in the lifting direction, in which the distance between a tip member and a base member varies, and the vibration in the feed direction in which the distance between the tip member and the base member does not vary, cannot be independently controlled. Another problem is that it is difficult to cause the tip member and the base member to efficiently vibrate in the lifting direction and in the feed direction.

The aspects of the invention provide a driving mechanism which can independently control vibrations in two different directions of a member to be driven by piezoelectric elements. The aspects of the invention also provide a driving mechanism which can cause a member to be driven by piezoelectric elements to efficiently vibrate in two different directions. Furthermore, the aspects of the invention also provide a lens barrel and a camera including the driving mechanism.

The aspects of the invention employ the following configuration corresponding to FIGS. 1 to 4 according to an embodiment of the invention. For purposes to make the explanation of the aspects of the invention easier, the aspects of the invention will be described below with reference to reference signs of the drawings illustrating the embodiment, but the invention is not limited to the embodiment.

According to an aspect of the invention, there is provided a driving mechanism (1) including: a first piezoelectric element (6); and a first driving member (3) that is driven by the first piezoelectric element (6) and that vibrates in a first direction, wherein the first driving member (3) includes a second piezoelectric element (7) and a second driving member (3a) that is driven by the second piezoelectric element (7) and that vibrates in a second direction different from the first direction, and a difference between the vibration resonance frequency of the first driving member (3) and the vibration resonance frequency of the second driving member (3a) is equal to or less than the half-width at a half maximum (HWHM) of a function (F1) representing an amplitude frequency characteristic in the vibration of the first driving member (3).

According to another aspect of the invention, there are provided a lens barrel (103) and a camera (101) including the driving mechanism (1).

The driving mechanism according to the aspect of the invention can independently control the vibrations in two different directions of a member to be driven by piezoelectric elements. The driving mechanism can also cause the member to be driven by the piezoelectric elements to efficiently vibrate in two different directions. According to the aspects of the invention, it is also possible to provide a lens barrel and a camera including the driving mechanism.

DESCRIPTION OF EMBODIMENTS

Hereinafter, an embodiment of the invention will be described with reference to the accompanying drawings.

A driving mechanism according to this embodiment performs a relative driving operation of displacing a rotor relative to a base member and drives an optical device or an electronic device such as a lens barrel of a camera and the like through the use of the rotor.

Figure 1:
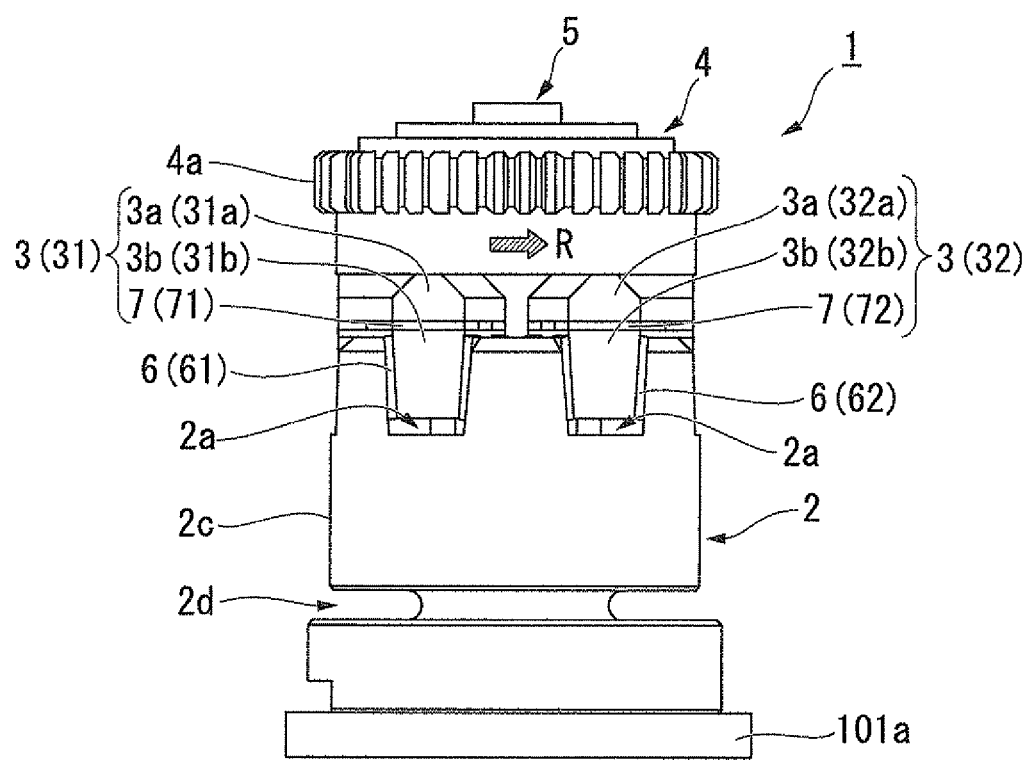
FIG. 1 is a front view of a driving mechanism according to an embodiment of the invention.

As shown in FIG. 1, a driving mechanism 1 includes a base member 2, a driving member (first driving member) 3, a rotor 4, a support shaft 5, and a first piezoelectric element 6.

The base member 2 is formed of a conductive material including such as stainless steel which can be considered as an elastic body. The base member 2 has a hollow cylindrical shape having a through-hole in the shaft direction at the center thereof. The surface of the base member 2 is subjected to insulating treatment and, for example, an insulating film is formed thereon. The support shaft 5 is inserted into the through-hole of the base member 2.

Plural holding portions 2a are formed at an end portion of the base member 2 so as to be adjacent to each other in the circumferential direction of the base member 2. Each holding portion 2a has a concave shape supporting the driving member 3 with the driving member 3 interposed between both sides in the circumferential direction of the base member 2. The other end of the base member 2 is fixed to a mounting section 101a by the use of a fastening member such as bolts which are not shown. A groove portion 2d which is continuous in the circumferential direction is formed in the part closer to the mounting section 101a than the center of the base member 2.

The driving mechanism 1 includes two groups of which each includes three driving members 3 and which are driven with a predetermined phase difference. In this embodiment, out of six driving members 3 arranged at an equal interval in the circumferential direction of the base member 2, three driving members 31 belong to the first group and three driving members 32 belong to the second group. The driving members 31 and the driving members 32 of the groups are alternately arranged in the circumferential direction of the base member 2, that is, in the rotation direction R of the rotor 4.

Each driving member 3 includes a base portion 3b, a tip portion (second driving member) 3a, and a second piezoelectric element 7.

The base portion 3b has a substantially rectangular parallelepiped shape of which a pair of side faces intersecting the circumferential direction is slightly inclined. The base portion 3b is formed of, for example, light metal alloy and the like and has conductivity. The base portion 3b is supported by the corresponding holding portion 2a so as to be movable in a direction parallel to the support shaft 5.

The tip portion 3a has a hexagonal prism shape having a mountain-like cross-section. The tip portion 3a is formed of, for example, stainless steel and the like and has conductivity. The tip portion 3a is disposed between the base portion 3b and the rotor 4 and protrudes from the holding portion 2a to support the rotor 4.

The second piezoelectric element 7 is disposed between the tip portion 3a and the base portion 3b of the driving member 3. That is, the second piezoelectric element 7 is supported by the base portion 3b of the driving member 3 and supports the tip portion 3a on the base portion 3b. Two second piezoelectric elements 7 are disposed adjacent to each other in the diameter direction of the base member 2.

The rotor 4 is mounted on the support shaft 5 with bearings (not shown) interposed therebetween and is disposed to be rotatable forward and backward in the rotation direction R about the support shaft 5. A gear 4a used to drive, for example, a lens barrel of a camera and the like is formed on the outer circumferential surface of the rotor 4. The surface of the rotor 4 facing the base member 2 is supported by plural driving members 3.

The support shaft 5 is a circular rod-like member of which the center line corresponds to the rotation shaft of the rotor 4. One end of the support shaft 5 is fixed to the mounting section 101a. The support shaft 5 passes through the base member 2 and the rotor 4. The support shaft 5 is disposed at the center of plural driving members 3 which are arranged in the rotation direction R of the rotor 4.

The first piezoelectric elements 6 are formed of, for example, a material including piezoelectric zirconate titanate (PZT). The first piezoelectric elements 6 are disposed between the inner face of the corresponding holding portion 2a of the base member 2 and the side face of the base portion 3b of the driving member 3. The first piezoelectric elements 6 are disposed to interpose the base portion 3b of the driving member 3 between the front side and the rear side in the rotation direction R of the rotor 4. Two first piezoelectric elements 6 are disposed on each of the front and rear side faces of the base portion 3b of the driving member 3 in the rotation direction R of the rotor 4. The two first piezoelectric elements 6 on each side face are arranged adjacent to each other in the diameter direction of the corresponding base member 2, that is, in the diameter direction of the rotor 4.

Each first piezoelectric element 6 has a strip-like shape which is long in the shaft direction of the support shaft 5. The first piezoelectric element 6 is disposed to vibrate in a thickness-shear vibration mode in the longitudinal direction parallel to the shaft direction (the first direction) of the support shaft 5. Each first piezoelectric element 6 is bonded to both the inner face of the corresponding holding portion 2a of the base member 2 and the side face of the base portion 3b of the driving member 3 with a conductive adhesive.

Here, the thickness direction of the first piezoelectric element 6 is defined as a direction tangential to the turning circle of the rotor 4 at the centers of the driving members 3, that is, a direction tangential to the central circle passing through the centers of the driving members 3 (a direction vertical to the side faces of the base portion 3b where the first piezoelectric element 6 are arranged, a direction orthogonal to the shaft direction of the support shaft 5 (the second direction)). At this time, the longitudinal elastic coefficient in the thickness direction of the first piezoelectric element 6 is greater than the transverse elastic coefficient in the length direction thereof. For example, when the vibration mode of the first piezoelectric element 6 is a longitudinal-effect thickness-shear vibration mode, the longitudinal elastic coefficient of the first piezoelectric element 6 is about 167 GPa and the transverse elastic coefficient thereof is about 25 GPa. That is, the transverse elastic coefficient of the first piezoelectric element 6 is about 1/6 times the longitudinal elastic coefficient.

Similarly, the longitudinal elastic coefficient of the base member 2 is also greater than the transverse elastic coefficient thereof. For example, when the base portion is formed of SUS304 as a main component, the longitudinal elastic coefficient is about 193 GPa and the transverse elastic coefficient is about 69 GPa. Here, the transverse elastic coefficient of the first piezoelectric element 6 is about 1/8 times the longitudinal elastic coefficient of the base member 2. For example, the transverse elastic coefficient in the length direction of the first piezoelectric element 6 is defined as kl and the longitudinal elastic coefficient of the base member 2 is defined as kb. In this case, the ratio kl/kb of the transverse elastic coefficient kl of the first piezoelectric element 6 and the longitudinal elastic coefficient kb of the base member 2 is preferably equal to or less than 1. The ratio kl/kb may be set to be less than 0.2.

The longitudinal elastic coefficient in the thickness direction of the first piezoelectric element 6 is equal to or less than the longitudinal elastic coefficient of the base member 2.

The second piezoelectric elements 7 are formed of, for example, a material including piezoelectric zirconate titanate (PZT). Each second piezoelectric element 7 has a strip-like shape which is long in the direction tangential to the central circle passing through the centers of the driving members 3, that is, in the direction tangential to the turning circle of the rotor 4 at the centers of the driving members 3 (a direction along with the circumferential direction of the base member 2 and parallel to the top surface of the base portion 3b where the second piezoelectric element 7 are arranged, a direction orthogonal to the shaft direction of the support shaft 5 (the second direction)). The second piezoelectric element 7 is disposed to vibrate in a thickness-shear vibration mode in the direction tangential to the central circle passing through the centers of the driving members 3, that is, in the tangential direction of the turning circle of the rotor 4 at the centers of the driving members 3 (a direction along with the circumferential direction of the base member 2 and parallel to the top surface of the base portion 3b where the second piezoelectric element 7 are arranged, a direction orthogonal to the shaft direction of the support shaft 5 (the second direction)). Each second piezoelectric element 7 is bonded to both the tip portion 3a and the base portion 3b of the corresponding driving member 3 with a conductive adhesive.

Here, the thickness direction of the second piezoelectric element 7 is defined as the direction parallel to the shaft direction of the support shaft 5. At this time, the longitudinal elastic coefficient in the thickness direction of the second piezoelectric element 7 is greater than the transverse elastic coefficient in the length direction thereof. For example, when the vibration mode of the second piezoelectric element 7 is a longitudinal-effect thickness-shear vibration mode, the longitudinal elastic coefficient of the second piezoelectric element 7 is about 167 GPa and the transverse elastic coefficient thereof is about 25 GPa. That is, the transverse elastic coefficient of the second piezoelectric element 7 is about ⅙ times the longitudinal elastic coefficient.

Figure 2A:
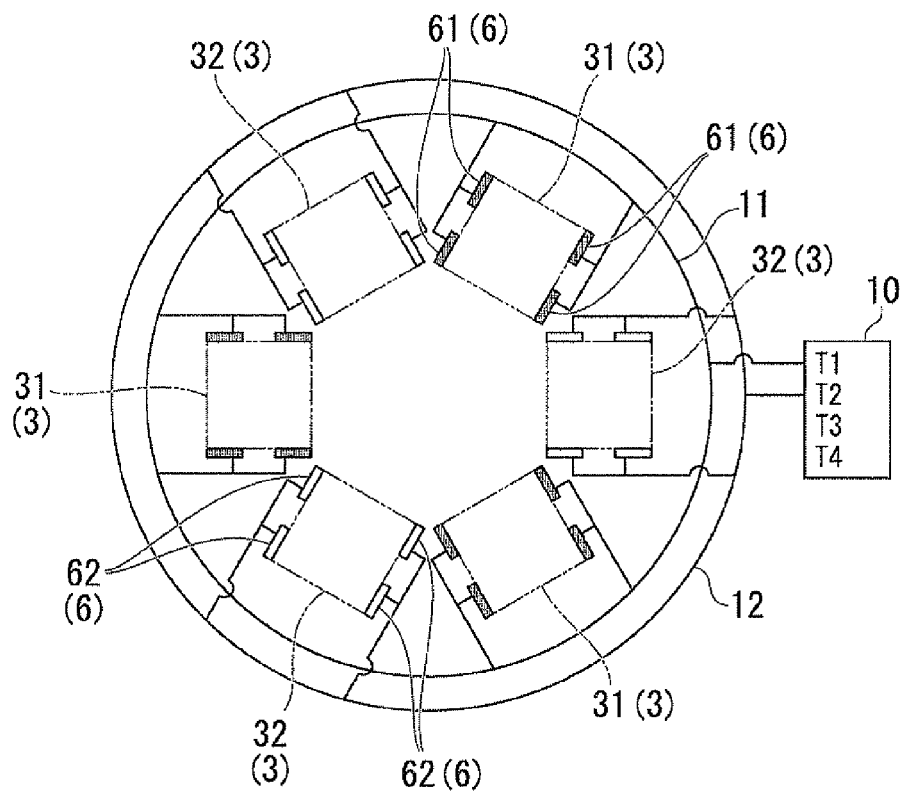
FIG. 2A is a circuit diagram of the driving mechanism shown in FIG. 1.
Figure 2B:
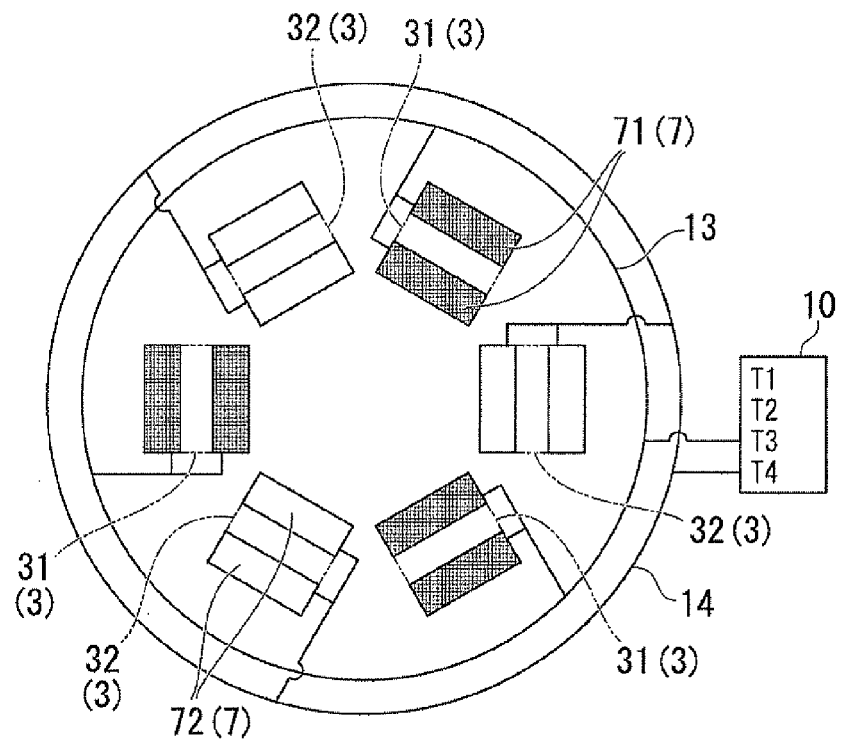
FIG. 2B is a circuit diagram of the driving mechanism shown in FIG. 1.

As shown in FIGS. 2A and 2B, the driving mechanism 1 includes a power supply unit 10 supplying voltages to the first piezoelectric elements 6 and the second piezoelectric elements 7. The power supply unit 10 includes first to fourth terminals T1 to T4. The first to fourth terminals T1 to T4 supply sinusoidal voltages of a predetermined frequency. The power supply unit 10 supplies voltages having a predetermined phase difference and having the same sinusoidal waveform between the first terminal T1 and the second terminal T2 and between the third terminal T3 and the fourth terminal T4.

As shown in FIGS. 1 and 2A, twelve first piezoelectric elements 61 disposed between three driving members 31 belonging to the first group and the base member 2 out of the first piezoelectric elements 6 are electrically connected to the first terminal T1 via a line 11. Twelve first piezoelectric elements 62 disposed between three driving members 32 belonging to the second group and the base member 2 out of the first piezoelectric elements 6 are electrically connected to the second terminal T2 via a line 12.

As shown in FIGS. 1 and 2B, six second piezoelectric elements 71 disposed between the tip portions 31a and the base portions 31b of three driving members 31 belonging to the first group out of the second piezoelectric elements 7 are electrically connected to the third terminal T3 via a line 13. Six second piezoelectric elements 72 disposed between the tip portions 32a and the base portions 32b of three driving members 32 belonging to the second group out of the second piezoelectric elements 7 are electrically connected to the fourth terminal T4 via a line 14.

In the driving mechanism 1, when the rotor 4 is made to rotate through the use of the driving members 3, three driving members 31 of the first group are driven synchronously. Three driving members 32 of the second group are driven synchronously with a predetermined phase difference from the driving members 31 of the first group, similarly to the first group. Accordingly, three driving members 31 of the first group and three driving members 32 of the second group alternately support the rotor 4 and cause the rotor 4 to rotate.

Specifically, the first terminal T1 of the power supply unit 10 supplies a sinusoidal voltage to the first piezoelectric elements 61. Then, the first piezoelectric elements 61 start their thickness-shear vibration in the first direction along the support shaft 5. The driving members 31 are driven by the deformation of the first piezoelectric elements 61 and move in the direction in which they are separated from the base portion 2.

At this time, the third terminal T3 of the power supply unit 10 supplies a sinusoidal voltage to the second piezoelectric elements 71. Then, the second piezoelectric elements 71 starts their thickness-shear vibration to the front side in the rotation direction R of the rotor 4 in the direction tangential to the central circle passing through the centers of the driving members 3, that is, in the direction tangential to the turning circle of the rotor 4 at the centers of the driving members 3 (a direction along with the circumferential direction of the base member 2 and parallel to the top surface of the base portion 3b where the second piezoelectric element 7 are arranged, a direction orthogonal to the shaft direction of the support shaft 5 (the second direction)). The tip portions 31a of the driving members 31 are driven in the direction (a direction along with the circumferential direction of the base member 2 and parallel to the top surface of the base portion 3b where the second piezoelectric element 7 are arranged, a direction orthogonal to the shaft direction of the support shaft 5) tangential to the central circle passing through the centers of the driving members 3, that is, in the second direction perpendicular to the shaft direction of the support shaft 5, by the deformation of the second piezoelectric elements 71. At this time, the tip portions 31a of the driving members 31 cause the rotor 4 to rotate forward in the rotation direction R thereof through the use of the frictional force acting between the rotor 4 and the tip portions 31a.

Thereafter, the first piezoelectric elements 61 start the reverse deformation in the direction in which they are separated from the rotor 4 by the sinusoidal voltage supplied from the first terminal T1 of the power supply unit 10. The driving members 31 of the first group move in the direction in which they are separated from the rotor 4 through the use of the reverse deformation of the first piezoelectric elements 61.

At this time, the second piezoelectric elements 71 start the reverse deformation to the rear side in the rotation direction R of the rotor 4 by the sinusoidal voltage supplied from the third terminal T3 of the power supply unit 10. The tip portions 31a of the driving members 31 of the first group move to the rear side in the rotation direction R of the rotor 4 through the use of the reverse deformation of the second piezoelectric elements 71 in the state where they are separated from the rotor 4.

Thereafter, the driving members 31 of the first group repeat the contact of the tip portions 31a with the rotor 4, the movement of the tip portions 31a to the front side in the rotation direction R of the rotor 4, the separation of the tip portions 31a from the rotor 4, and the movement of the tip portions 31a to the rear side in the rotation direction R of the rotor 4. That is, the base portions 31b and the tip portions 31a of the driving members 31 are driven by the first piezoelectric elements 61 and vibrate in the first direction which is the shaft direction of the support shaft 5. The tip portions 31a of the driving members 31 are driven by the second piezoelectric elements 71 and vibrate in the direction tangential to the central circle passing through the centers of the driving members 3, that is, in the direction tangential to the turning circle of the rotor 4 at the centers of the driving members 3 (a direction along with the circumferential direction of the base member 2 and parallel to the top surface of the base portion 3b where the second piezoelectric element 7 are arranged, a direction orthogonal to the shaft direction of the support shaft 5 (the second direction)). Accordingly, the driving members 31 of the first group are driven so that the tip portions 31a draw a circular locus or an elliptical locus.

The driving members 32 of the second group are driven with a predetermined phase difference from the driving members 31 of the first group, similarly to the driving members 31 of the first group. That is, the second terminal T2 of the power supply unit 10 supplies a sinusoidal voltage having the same waveform as the voltage supplied from the first terminal T1 and having a predetermined phase difference from the voltage supplied from the first terminal T1 to the first piezoelectric elements 62. The fourth terminal T4 of the power supply unit 10 supplies a sinusoidal voltage having the same waveform as the voltage supplied from the third terminal T3 and having a predetermined phase difference from the voltage supplied from the third terminal T3 to the second piezoelectric elements 72.

The tip portions 32a of three driving members 32 of the second group come in contact with the rotor 4 before the tip portions 31a of three driving members 31 of the first group is separated from the rotor 4, and are separated from the rotor 4 after the tip portions 31a of three driving members 31 of the first group come in contact with the rotor 4. Accordingly, the rotor 4 is alternately supported and driven by three driving members 31 of the first group and three driving members 32 of the second group, and rotate forward or backward in the rotation direction R at a predetermined rotation speed in the state where its position in the shaft direction of the support shaft 5 is kept substantially constant.

Figure 3:
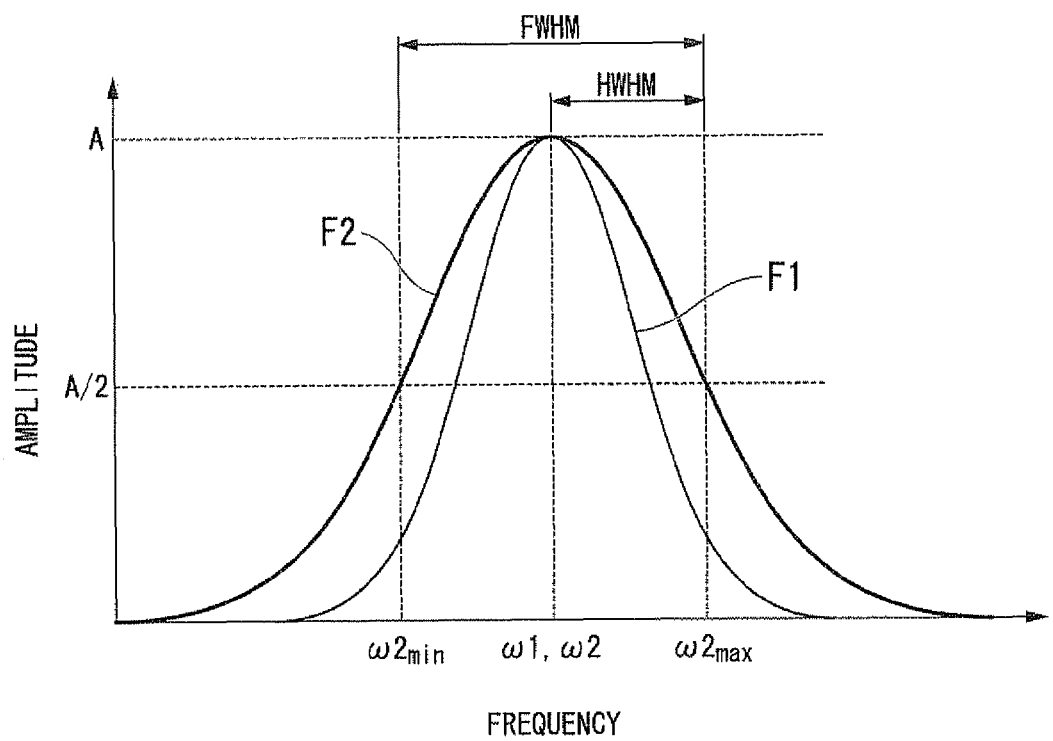
FIG. 3 is a graph illustrating the amplitude frequency characteristic of a driving member of the driving mechanism shown in FIG. 1 and a tip portion thereof.

As shown in FIG. 3, a function F1 representing the amplitude frequency characteristic in the vibration of the driving members 3 in the first direction parallel to the support shaft 5 by the first piezoelectric elements 6 indicates substantially a normal distribution. Similarly, a function F2 representing the amplitude frequency characteristic of the vibration of the tip portions 3a of the driving members 3 in the second direction perpendicular to the support shaft 5 by the second piezoelectric elements 7 indicates substantially a normal distribution.

In the driving mechanism 1, the total mass of the driving members 3 and the mass of the tip portions 3a are determined so that the vibration resonance frequency $\omega 1$ of all the driving members 3 and the vibration resonance frequency $\omega 2$ of the tip portions 3a of the driving members 3 are equal to each other.

Here, the elastic coefficient in the first direction of four first piezoelectric elements 6 is defined as K1 and the elastic coefficient in the second direction of two second piezoelectric elements 7 is defined as K2. The total mass of the base portion 3b and the tip portion 3a of the driving member 3 and the second piezoelectric elements 7 is defined as M1 and the mass of the tip portion 3a of the driving member 3 is defined as M2.

In the driving mechanism 1, the elastic coefficient K1, the elastic coefficient K2, the mass M1, and the mass M2 are determined to satisfy Expression 1.

$$K1/K2 = M1/M2 \tag{1}$$

That is, in the driving mechanism 1, the elastic coefficient K1, the elastic coefficient K2, the mass M1, and the mass M2 are determined so that the ratio K1/K2 of the elastic coefficient K1 and the elastic coefficient K2 is equal to the ratio M1/M2 of the mass M1 and the mass M2.

In the driving mechanism 1, all the first piezoelectric elements 6 and the second piezoelectric elements 7 have the same shape long in one direction and the same size. The first piezoelectric elements 6 are disposed so that the length direction is the first direction parallel to the shaft direction of the support shaft 5 which is the vibration direction of the driving member 3. Similarly, the second piezoelectric elements 7 are disposed so that the length direction is the second direction perpendicular to the shaft direction of the support shaft 5 which is the vibration direction of the tip portion 3a of the driving member 3.

Here, the number of first piezoelectric elements 6 driving each driving member 3 is defined as N1 and the number of second piezoelectric elements 7 driving the tip portion 3a thereof is defined as N2. The transverse elastic coefficient of each piezoelectric element 6 is defined as k1 and the transverse elastic coefficient of each second piezoelectric element 7 is defined as k2. Then, the elastic coefficient K1 in the first direction of the first piezoelectric elements 6 and the elastic coefficient K2 in the second direction of the second piezoelectric elements 7 are expressed by Expressions 2 and 3.

$$K1 = N1 \times k1 \tag{2}$$

$$K2 = N2 \times k2 \tag{3}$$

Expression 4 is obtained from Expression 1 through the use of Expressions 2 and 3.

$$N1/N2 = M1/M2 \tag{4}$$

That is, in the driving mechanism 1, the elastic coefficient K1, the elastic coefficient K2, the number N1, and the number N2 are determined so that the ratio N1/N2 of the number N1 of first piezoelectric elements 6 and the number N2 of second piezoelectric elements 7 is equal to the ratio M1/M2 of the mass M1 and the mass M2.

The vibration resonance frequency $\omega 1$ of the driving members 3 as a whole and the vibration resonance frequency $\omega 2$ of the tip portions 3a of the driving members 3 may be different from each other to some extent. In this case, the difference between the vibration resonance frequency $\omega 1$ of the driving members 3 as a whole and the vibration resonance frequency $\omega 2$ of the tip portions 3a of the driving members 3 should be equal to or less than a half of the full-width at half maximum (FWHM) representing the amplitude frequency characteristic of the overall driving members 3, that is, a half-width at half maximum (HWHM).

For example, as shown in FIG. 3, when the allowable minimum value of the vibration resonance frequency $\omega 2$ of the tip portions 3a of the driving members 3 is defined as $\omega 2_{min}$ and the allowable maximum value thereof is defined as $\omega 2_{max}$, these values can be expressed by Expressions 5 and 6 using the half-width at half maximum HWHM.

$$\omega 2_{min} = \omega 1 - HWHM \tag{5}$$

$$\Omega 2_{max} = \omega 1 + HWHM \tag{6}$$

In this way, the driving mechanism 1 includes the first piezoelectric elements 6 vibrating in the thickness-shear vibration mode in the first direction parallel to the support shaft 5 and the second piezoelectric elements 7 vibrating in the thickness-shear vibration mode in the direction tangential to the central circle passing through the centers of the driving members 3, that is, in the direction tangential to the turning circle of the rotor 4 at the centers of the driving members 3 (a direction along with the circumferential direction of the base member 2 and parallel to the top surface of the base portion 3b where the second piezoelectric element 7 are arranged, a direction orthogonal to the shaft direction of the support shaft 5 (the second direction)).

Accordingly, the base portion 3b and the tip portion 3a of each driving member 3 can be made to vibrate in the direction parallel to the support shaft 5 relative to the base member 2 by the use of the first piezoelectric elements 6. The tip portion 3a of each driving member 3 can be made to vibrate in the direction tangential to the central circle passing through the centers of the driving members 3, that is, in the direction tangential to the turning circle of the rotor 4 at the centers of the driving members 3, relative to the base member 2 and the base portion 3b of the driving member 3 by the use of the second piezoelectric elements 7 (a direction along with the circumferential direction of the base member 2 and parallel to the top surface of the base portion 3b where the second piezoelectric element 7 are arranged, a direction orthogonal to the shaft direction of the support shaft 5 (the second direction)).

Therefore, in the driving mechanism 1 according to this embodiment, it is possible to independently control the vibration of the tip portions 3a of the driving members 3 in the direction (the first direction) parallel to the support shaft 5 and the vibration of the tip portions 3a in the direction (a direction orthogonal to the shaft direction of the support shaft 5 (the second direction)) tangential to the turning circle of the rotor 4 at the centers of the driving members 3 by independently controlling the first piezoelectric elements 6 and the second piezoelectric elements 7. Accordingly, it is possible to cause the driving members 3 to efficiently vibrate in the directions and to cause the rotor 4 to efficiently rotate.

In the driving mechanism 1, the number N1, the shape, and the size of the first piezoelectric elements 6, the number N2, the shape, and the size of the second piezoelectric elements 7, the mass M1 of the driving members 3, and the mass M2 of the tip portions 3a of the driving members 3 are determined to satisfy Expressions 1 and 4.

Specifically, the number N1 of the first piezoelectric elements 6 is 4. The number N2 of the second piezoelectric elements 7 is 2. The first piezoelectric elements 6 and the second piezoelectric elements 7 have the same size and shape and the length directions thereof are arranged to correspond to the vibration directions, respectively. The total mass M1 of each driving member 3 is made twice of the mass M2 of the tip portion 3a of the driving member 3.

Accordingly, the natural vibration frequency of the driving member 3 based on the first piezoelectric elements 6 and the natural vibration frequency of the tip portion 3a of the driving member 3 based on the second piezoelectric elements 7 are equal to each other. That is, the vibration resonance frequency $\omega 1$ of the driving member 3 as a whole in the first direction and the vibration resonance frequency $\omega 2$ of the tip portion 3a of the driving member 3 in the second direction are equal to each other. Accordingly, the amplitudes of the tip portion 3a of the driving member 3 in the first direction and the second direction perpendicular to each other are the maximum. Therefore, it is possible to further efficiently drive the tip portions 3a of the driving members 3 which draw a circular locus or an elliptical locus through the use of the vibration in the first and second directions.

Similarly, even when the vibration resonance frequency $\omega 1$ of the driving member 3 as a whole and the vibration resonance frequency $\omega 2$ of the tip portion 3a of the driving member 3 are different from each other, it is possible to further efficiently drive the tip portion 3a of the driving member 3 by setting the difference to be equal to or less than the HWHM shown in FIG. 3.

In the driving mechanism 1, the first electric elements 6 vibrate in the thickness-shear vibration mode in the direction parallel to the support shaft 5 which is a direction in which the base portions 3b of the driving members 3 are driven. That is, in the first piezoelectric elements 6, the longitudinal elastic coefficient indicating the stiffness in the thickness direction is greater than the transverse elastic coefficient indicating the stiffness in the vibration direction. In other words, in the first piezoelectric elements 6, the stiffness in the direction (the first direction) in which the base portion 3b of each driving member 3 vibrates is relatively small and the stiffness in the direction (the second direction) perpendicular to the direction in which the base portion 3b of the driving member 3 vibrates is relatively great.

In the driving mechanism 1, the tip portion 3a vibrates in the direction (the second direction) tangential to the turning circle of the rotor 4 at the centers of the driving members 3, which is the direction perpendicular to the direction (the first direction) in which the base portions 3b vibrate, on the base portion 3b of the driving member 3. However, in the first piezoelectric elements 6, the stiffness in the direction (the first direction) in which the base portion 3b of each driving member 3 vibrates is relatively small and the stiffness in the vibration direction (the second direction) of the tip portion 3a which is the direction perpendicular to the direction in which the base portion 3b of the driving member 3 vibrates is relatively great. The first piezoelectric elements 6 are arranged to interpose the base portion 3b of each driving member 3 between both sides in the vibration direction of the tip portion 3a. Accordingly, the sufficient resistance to the inertial force based on the vibration of the tip portion 3a of the driving member 3 acts from the first piezoelectric elements 6 to the base portion 3b of the driving member 3. Accordingly, even when the tip portion 3a of the driving member 3 vibrates in the direction (the second direction) tangential to the turning circle of the rotor 4 at the centers of the driving members 3, the base portion 3b does not vibrate in the direction well.

In the driving mechanism 1, the second piezoelectric elements 7 vibrate in the thickness-shear vibration mode in the direction (the second direction) which is perpendicular to the support shaft 5 and which is the direction in which the tip portion 3a of each driving member 3 is driven. That is, in the second piezoelectric elements 7, the longitudinal elastic coefficient indicating the stiffness in the thickness direction is greater than the transverse elastic coefficient indicating the stiffness in the vibration direction. In other words, in the second piezoelectric elements 7, the stiffness in the direction (the second direction) in which the tip portion 3a of the driving member 3 vibrates is relative small and the stiffness in the direction (the first direction) in which the base portion 3b of the driving member 3 vibrates is relatively great. Accordingly, the tip portion 3a of the driving member 3 vibrates along with the base portion 3b in the vibration direction (the first direction), which is parallel to the shaft direction of the support shaft 5, due to the first piezoelectric elements 6. On the other hand, the tip portion 3a of the driving member 3 vibrates independently of the base portion 3b in the vibration direction (the second direction), which is parallel to the direction tangential to the turning circle of the rotor 4 at the centers of the driving members 3, due to the second piezoelectric elements 7.

Therefore, in the driving mechanism 1 according to this embodiment, it is possible to prevent the vibration of the base portion 3b of each driving members 3 from interfering with the vibration in the direction (the second direction) perpendicular to the vibration direction (the first direction). It is also possible to independently prevent the vibration of the tip portion 3a of each driving member 3 from interfering with the vibration in the direction (the first direction) perpendicular to the vibration direction (the second direction). As a result, it is possible to independently control the vibration of the tip portion 3a of each driving member 3 in the direction (the first direction) parallel to the support shaft 5 and the vibration of the tip portion 3a of the driving member 3 in the direction (the second direction) perpendicular to the support shaft 5.

In the driving mechanism 1, the longitudinal elastic coefficient of the base portion 2 is greater than the longitudinal elastic coefficient of the first piezoelectric elements 6. Accordingly, it is possible to cause the sufficient resistance to the inertial force, which acts on the base portion 2 via the first piezoelectric element 6, based on the vibration of the tip portion 3a of each driving member 3 by the use of the inner faces of the corresponding holding portion 2a of the base member 2. Therefore, it is possible to prevent the base portion 3b of the driving member 3 to vibrate in the vibration direction (the second direction) of the tip portion 3a. The longitudinal elastic coefficient of the first piezoelectric elements 6 may be equal to the longitudinal elastic coefficient of the base member 2.

Here, it is assumed that the ratio kl/kb of the transverse elastic coefficient kl of the first piezoelectric elements 6 and the longitudinal elastic coefficient kb of the base member 2 is equal to or greater than 0.2. Then, the difference between the stiffness of the first piezoelectric elements 6 in the vibration direction (the first direction) of the base portion 3b of the driving member 3 and the stiffness of the first piezoelectric elements 6 in the direction perpendicular (the second direction) to the vibration direction may not be sufficient. In this case, the vibration of the base portion 3b of the driving member 3 in the direction (the first direction) parallel to the shaft direction of the support shaft 5 may interfere with the vibration of the tip portion 3a of the driving member 3 parallel to the direction (a direction along with the circumferential direction of the base member 2 and parallel to the top surface of the base portion 3b where the second piezoelectric element 7 are arranged, a direction orthogonal to the shaft direction of the support shaft 5 (the second direction)) tangential to the turning circle of the rotor 4 at the centers of the driving members 3, thereby not independently controlling the vibrations.

In the driving mechanism 1, the ratio kl/kb is less than 0.2. Therefore, the vibration of the base portion 3b of the driving member 3 in the direction (the first direction) parallel to the shaft direction of the support shaft 5 and the vibration of the tip portion 3a of the driving member 3 parallel to the direction (a direction along with the circumferential direction of the base member 2 and parallel to the top surface of the base portion 3b where the second piezoelectric element 7 are arranged, a direction orthogonal to the shaft direction of the support shaft 5 (the second direction)) tangential to the turning circle of the rotor 4 at the centers of the driving members 3 can be made to be independent of each other, thereby independently controlling the vibrations.

As described above, in the driving mechanism 1 according to this embodiment, it is possible to independently control the vibrations in two different directions of the base portion 3b and the tip portion 3a of the driving member 3 which is driven by the first piezoelectric elements 6 and the second piezoelectric elements 7. Also, it is possible to cause the base portion 3b and the tip portion 3a of the driving member 3, which is driven by the first piezoelectric elements 6 and the second piezoelectric elements 7, to efficiently vibrate in two different directions.

Examples of a lens barrel and a camera including the driving mechanism 1 according to this embodiment will be described below. An interchangeable lens according to this embodiment forms a camera system along with a camera body. The interchangeable lens can be switched between an AF (Auto Focus) mode in which a focusing operation is performed under a known AF control and an MF (Manual Focus) mode in which the focusing operation is performed in response to a manual input from a photographer.

Figure 4:
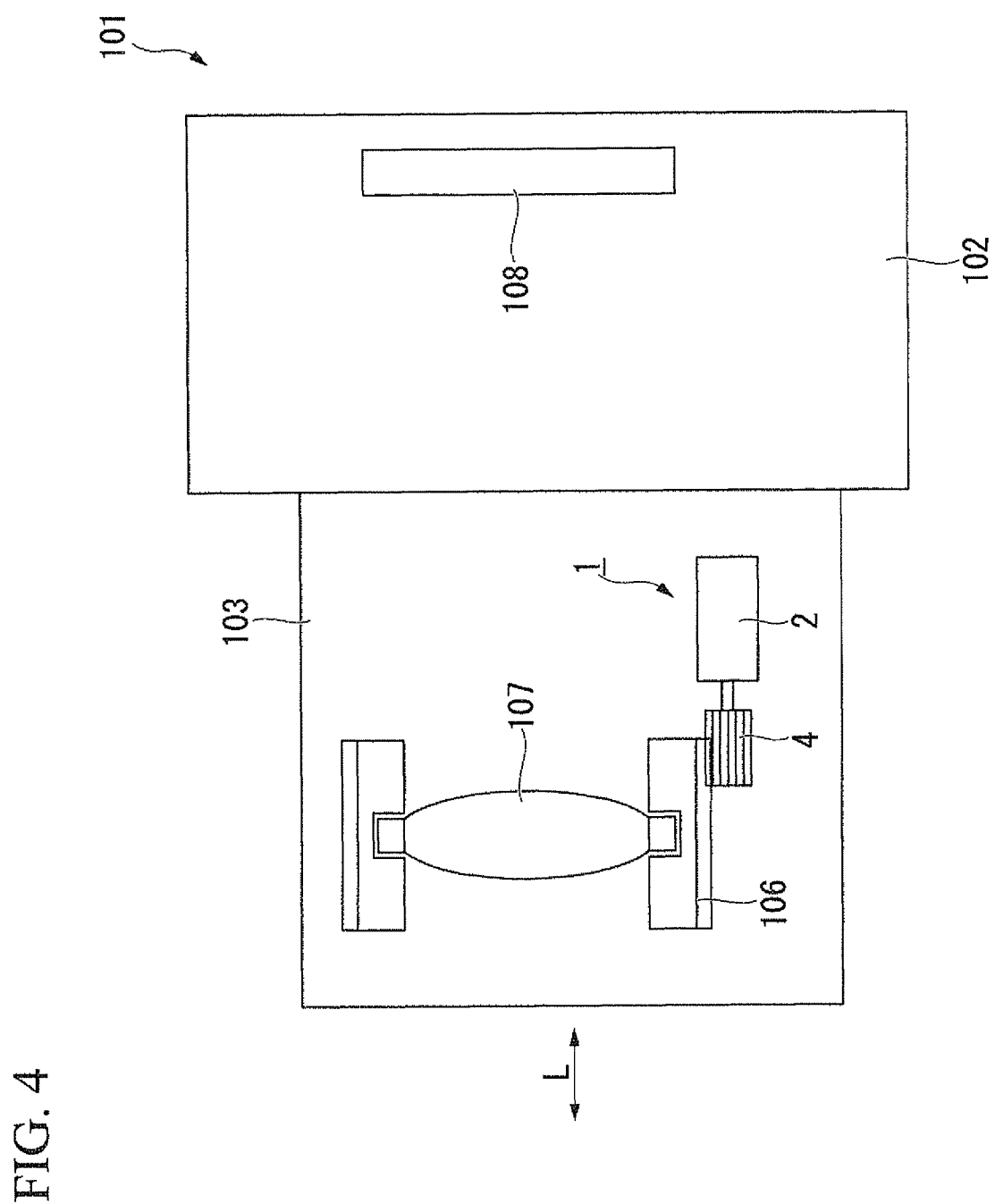
FIG. 4 is a diagram schematically illustrating the configurations of a lens barrel and a camera including the driving mechanism shown in FIG. 1.

As shown in FIG. 4, a camera 101 includes a camera body 102 having an imaging device 108 built therein and a lens barrel 103 having a lens 107.

The lens barrel 103 is an interchangeable lens that can be attached to and detached from the camera body 102. The lens barrel 103 includes the lens 107, a cam box 106, and a driving mechanism 1, and the like. The driving mechanism 1 is used as a drive source driving the lens 107 in the focusing operation of the camera 101.

The driving force acquired from the rotor 4 of the driving mechanism 1 is transmitted directly to the cam box 106. The lens 107 is supported by the cam box 106 and is a focusing lens that moves substantially in parallel to the optical axis direction L to adjust the focus through the use of the driving force of the driving mechanism 1.

At the time of using the camera 101, a subject image is formed on the imaging plane of the imaging device 108 through the use of a lens group (including the lens 107) disposed in the lens barrel 103. The formed subject image is converted into an electrical signal by the imaging device 108 and image data is acquired by A/D converting the electric signal.

As described above, the camera 101 and the lens barrel 103 include the above-mentioned driving mechanism 1. Accordingly, it is possible to cause the rotor 4 to further efficiently rotate and to efficiently drive the lens 107.

Although it has been stated in this embodiment that the lens barrel 103 is an interchangeable lens, the invention is not limited to this example and a lens barrel incorporated into the camera body may be used.

While an exemplary embodiment of the invention has been described, the invention is not limited to the exemplary embodiment. Addition, removal, and replacement of elements and other modifications may be made to the invention without departing from the concept of the invention. The invention is not limited to the above description and is defined by only the scope of the appended claims.

For example, the piezoelectric elements may be deformed in the thickness direction instead of being deformed in the thickness-shear vibration mode. In this case, the ratio of the longitudinal elastic coefficient of the first piezoelectric elements and the longitudinal elastic coefficient of the second piezoelectric elements may be equal to the ratio of the sum of the total mass of the driving member and the mass of the tip portion to the mass of the tip portion. In this case, the same advantages as using the piezoelectric elements vibrating in the thickness-shear vibration mode can be obtained.

What is claimed is:

1. A driving mechanism comprising: a first piezoelectric element; and
a first driving member that vibrates in a first direction due to the piezoelectric element,
wherein the first driving member comprises a base member that vibrates in the first direction by the driving of the first piezoelectric element, a second piezoelectric element that is provided at the base member, and a second driving member that vibrates in a second direction due to the piezoelectric element, and
wherein a difference between vibration resonance frequency of the first driving member and a vibration resonance frequency of the second driving member is equal to or less than a predetermined value, the predetermined value being a half of difference value between two frequencies with each at a half maximum amplitude of a function which represents an amplitude frequency characteristic of the first driving member.

2. The driving mechanism according to claim 1, wherein the vibration resonance frequency of the first driving member and the vibration resonance frequency of the second driving member are the same.

3. The driving mechanism according to claim 2, wherein a ratio (K1/K2) of an elastic coefficient (K1) in the first direction of the first piezoelectric element and an elastic coefficient (K2) in the second direction of the second piezoelectric element is the same as a ratio (M1/M2) of the mass (M1) of the first driving member and the mass (M2) of the second driving member.

4. The driving mechanism according to claim 2, wherein the first piezoelectric element has the same shape and size as the second piezoelectric element, and
wherein a ratio (N1/N2) of the number of the first piezoelectric elements (N1) and the number of the second piezoelectric elements (N2) is equal to a ratio (M1/M2) of the mass (M1) of the first driving member and the mass (M2) of the second driving member.

5. The driving mechanism according to claim 1, wherein the first direction and the second direction are perpendicular to each other.

6. A lens barrel comprising the driving mechanism according to claim 1.

7. A camera comprising the driving mechanism according to claim 1.

8. The driving mechanism according to claim 1, further comprising:
   a movable member that is moved by the vibration of the second driving member, wherein the second driving member is arranged between the movable member and the base member.

* * * * *